Jan. 2, 1968  C. B. REED  3,361,368
PROCESS OF EXTRACTING POLLEN
Filed March 23, 1966
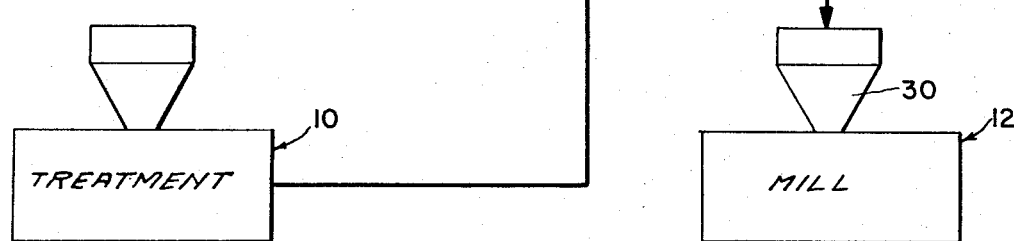
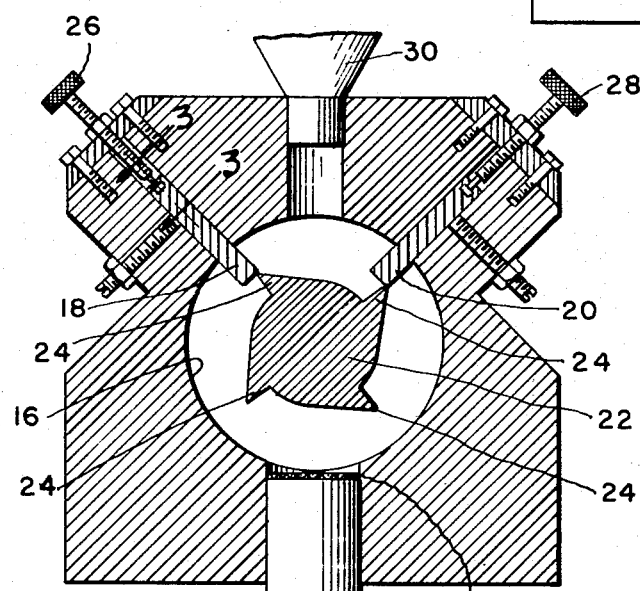
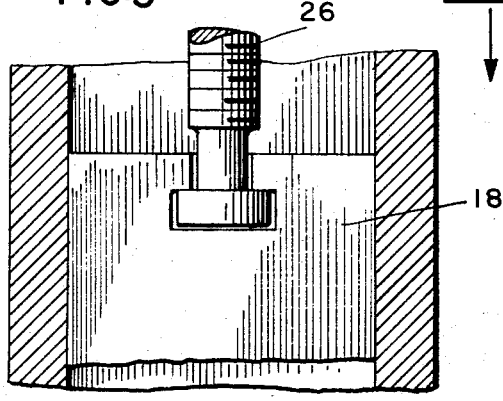
INVENTOR.
CHARLES B. REED
BY
*Lyon & Lyon*
ATTORNEYS 3,361,368
PROCESS OF EXTRACTING POLLEN
Charles B. Reed, 411 S. Chester Ave.,
Bakersfield, Calif. 93304
Filed Mar. 23, 1966, Ser. No. 536,755
6 Claims. (Cl. 241—7)

ABSTRACT OF THE DISCLOSURE

This patent describes a process which comprises introducing anthers into a zone having a temperature and a relative humidity at which said anthers normally dehisce, retaining said anthers in said zone until a major portion of said anthers have dehisced, and cutting the anthers but not the pollen grains therein until all the cut materials will pass through a 10 mesh to 40 mesh screen.

---

This invention relates to a novel process for the releasing of greater quantities of pollen from harvested flower bud anthers.

Pollen is widely used in bee hive inserts and similar places, generally in the form of screened material which normally contains in addition to freed pollen, anthers and other small flower parts capable of passing a fine screen. In some cases the pollen is used in conjunction with a diluent or carrier such as lycopodium.

It has long been recognized that the anthers in untreated form contain much pollen that would be of beneficial use to the grower. However, no satisfactory method has been available for releasing most of the pollen from the anthers other than natural dehiscence. It has been proposed to grind, crush or mill the anthers and to thereby release more of the pollen. However, the available techniques have generally resulted in incomplete removal or considerable damage to the pollen. Accordingly, it is apparent that there has been a long recognized need for some method of freeing more of the pollen from the anthers without excessive damage to the pollen to increase the yield of viable pollen.

Accordingly, it is a principal object of the present invention to provide a novel method for the processing of anthers whereby more viable pollen is released.

More particularly, it is an object of the present invention to provide a novel method of releasing a greater quantity of pollen from harvested flower bud anthers than is released by conventional drying or dehiscing methods.

More specifically, it is an object of the present invention to provide a novel method of releasing a greater quantity of pollen from harvested flower bud anthers by first drying the anthers at a temperature of from about 72 to 75° F. and a relative humidity of 45 to 60% to allow the major portion of the anthers to dehisce prior to the milling of the treated anthers.

These and other objects of the present invention will become apparent from the more detailed description which follows, taken in conjunction with the accompanying drawing.

Briefly, the present invention comprises a novel process of releasing a greater quantity of pollen from harvested flower bud anthers than is released by conventional methods and includes the steps of:

(1) Maintaining the anthers on shallow drying trays under conditions which simulate the atmospheric conditions conducive to the opening of flowers in the field, normally at a temperature range of from about 72° F. to about 75° F., and relative humidity of about 45 to 65% for a period of from about 24 to 36 hours to allow the major portion of the anthers to dehisce, to shed or expose the pollen grains contained therein, the conditions being generally dependent upon the particular variety of anther being treated; and (2) Passing the thus treated anthers through the cutter blades of a desiccated plant tissue mill having sufficient clearance to cut only the anthers but not the pollen grains so that all the cut material will pass through a 10 mesh to 40 mesh screen thereby releasing most of the pollen grain that normally remain in or attached to the anther.

It has been found that according to the foregoing process, there results a higher yield of viable pollen grains and more uniform particle size, making possible mechanical metering of the pollen materials through bee hive inserts, for example of the type disclosed in U.S. Patent No. 3,069,702, or other mechanical applicators. The material produced by the process of the present invention requires no diluent, although the use of diluents and carriers is within the scope of the present invention where it is desirable to use these added ingredients for convenience of bulk.

In the process of the present invention considerably more pollen grain is released from the anthers than is accomplished by the conventional dehiscing processes of the prior art. Under average conditions 20 to 40% of all anthers fail to dehisce or expose pollen. However, the process of the present invention represents a considerable improvement since it results in the release of most of the pollen grains that would otherwise remain attached to the anthers. The release of the pollen from the anthers is of prime importance since it has been found that pollen which is not released by the anthers has little or no value.

Turning to the drawing:

FIGURE 1 is a flow diagram of the process of this invention;

FIGURE 2 is a cross-sectional view of the mill utilized in step 2 of the process of this invention; and FIGURE 3 is a sectional view taken along the line 3—3 in FIGURE 2.

As shown in FIGURE 1, the anthers are introduced into treatment enclosure 10 where step 1 is carried out. The treated anthers are then removed, continuously or batch-wise, to mill 12 where step 2 is accomplished. The final product is normally collected at 14 for storage or packaging.

Step 1 of the process as described above may be carried out in any type of enclosure 10 wherein the temperature and humidity can be readily maintained within the desired limit. Normally such enclosure 10 is provided with a temperature and humidity indicator and may also be provided with automatic control equipment whereby the temperature and humidity are varied within the container in response to sensing means located within the container.

Step 2 of the process as described above is normally carried out using commercially available milling equipment 12. In this connection it should be noted that a cutting mill is used in preference to a grinding mill since a cutting mill will effectively cut only the anthers without extensively damaging the pollen grains which would be undesirable. The preferred cutting mill is a Wiley mill available from Van Waters & Rogers, Inc. This mill permits rapid milling of desiccating plant tissue and is motor driven. As is shown in FIGURES 2 and 3, it is provided with a polished chamber 16, normally about 40 mm. in diameter by 20 mm. deep, with two stationary blades 18 and 20 and a rotor 22 with four cutting blades 24 which revolves at high speed to produce shearing action. The stationary blades 18 and 20 are adjustable so that they can be set at any desired clearance necessary to cut only the anthers, while maintaining the desired screen size. The adjustment is made by the turning of screws 26 and 28 which engage the ends of blades 18 and 20, respectively.

In use, the anthers are introduced through the hopper 30 at the top of the mill 12 and agitated by the high speed of the rotor until cut to sufficient fineness to fall through the screen 32 at the top of the delivery tube 34 which forms the bottom of the mill chamber. The screen 32 is interchangeable, and for use in the present invention is provided with a screen of from 10 to 40 mesh. In this way the material removed through the delivery tube 34 is of the desired screen size.

The flowers employed in the present invention are normally gathered when many of them are in the bloom stage just before the petals open. The anthers may be separated from the other flower parts by rubbing them over an 8-mesh cloth. The particular flowers selected depend upon the type of pollenizer desired. Thus, pollen for any particular pollination operation may be obtained by gathering flowers for a variety known to be a good pollenizer for the main variety in question.

The following example is presented simply to illustrate the invention, and should not be regarded as limiting the invention in any way.

*Example*

Almond anthers are placed on a shallow drying tray and maintained in a closed room at 72° F. and 55% relative humidity for about 32 hours to cause a major portion of the anthers to dehisce. The anthers are then passed through a plant tissue mill of the type shown in FIGURE 2 so that all of the cut material will pass through a 10 mesh to 40 mesh screen. Essentially complete recovery of the pollen grain originally present in the almond anthers is recovered in viable form.

It will be understood that all of the material treated in accordance with step 1 need not necessarily be subjected to the cutting treatment of step 2. Thus, for example, it is envisioned that the material after treatment according to step 1 may be passed through a screening process or sifting vibrator to separate the anthers from the shed pollen. Thereafter, the pollen remaining in the anthers may be separated therefrom by passing the anthers through the cutting operation of step 2.

In certain cases depending upon the volume of material being handled, it is not possible to immediately pass the material from step 1 into the cutting operation of step 2. In this case it may be desirable to provide a holding step between step 1 and step 2. It has been found that the anthers treated in accordance with step 1 may be held and stored for a long period prior to cutting by simply placing them in storage at low temperature on the order of 0° F. It has been found that the anthers may be stored under these conditions for several minutes up to 10 or 12 hours or more prior to their introduction into the Wiley mill.

As will be immediately apparent to those skilled in the art, the method of the present invention will find wide applicability in the processing of all types of anthers. Many variations are possible within the scope of this invention. Thus, the invention is capable of being carried out in any type of equipment so long as the operating conditions can be maintained within the general limits set forth above.

Having fully described the invention it is intended that it be limited only by the lawful scope of the appended claims.

I claim:

1. A process for releasing a greater quantity of pollen from harvested flower bud anthers which comprises the steps of maintaining the anthers at a temperature of from about 72° F. to 75° F. and a relative humidity of from about 45 to 65% for a period of from about 24 to 36 hours to allow the major portion of the anthers to dihisce, and passing the anthers through the cutter blades of a disiccated plant tissue mill having sufficient clearance to cut only the anthers but not the pollen grains so that all the cut material will pass through a 10 mesh to 40 mesh screen thereby releasing most of the pollen grains that normally remain attached to the anthers.

2. The process of claim 1 wherein the product is blended with a diluent.

3. The process of claim 1 wherein the anthers after being allowed to dehisce are stored at about 0° F. prior to being passed through the cutter blades of the desiccated plant tissue mill.

4. A process for gathering greater quantities of pollen from harvested flower bud anthers which comprises the steps of maintaining the anthers at a temperature of from about 72° F. to 75° F. and a relative humidity of from about 45 to 65% for a period of from 24 to 36 hours to allow the major portion of the anthers to dehisce, separating the freed pollen from said anthers, and passing the anthers through the cutter blades of a desiccated plant tissue mill having sufficient clearance to cut only the anthers but not the pollen grains so that all the cut material will pass through a 10 mesh to 40 mesh screen thereby releasing most of the pollen grains that normally remain attached to the anthers.

5. The process which comprises introducing anthers into a zone having a temperature and a relative humidity at which said anthers normally dehisce, retaining said anthers in said zone until a major portion of said anthers have dehisced, and passing the anthers through the cutter blades of a desiccated plant tissue mill having sufficient clearance to cut only the anthers but not the pollen grains so that all of the cut material will pass through a 10 mesh to 40 mesh screen, thereby releasing most of the pollen grains that normally remain attached to the anthers.

6. The product of the process of claim 5.

References Cited

UNITED STATES PATENTS

| | | | |
|---|---|---|---|
| 834,746 | 10/1906 | Moulie | 47—1.41 |
| 2,435,951 | 2/1948 | Antles | 6—4 |
| 2,995,868 | 8/1961 | Casper | 47—1.41 |

WILLIAM W. DYER, Jr., *Primary Examiner.*

R. J. ZLOTNIK, *Assistant Examiner.*